(12) United States Patent
Okita et al.

(10) Patent No.: US 7,199,703 B2
(45) Date of Patent: Apr. 3, 2007

(54) SEATBELT USE INDICATING APPARATUS AND METHOD

(75) Inventors: Munechika Okita, Nisshin (JP); Masanori Oyabu, Toyota (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 222 days.

(21) Appl. No.: 10/733,473

(22) Filed: Dec. 12, 2003

(65) Prior Publication Data

US 2004/0155765 A1 Aug. 12, 2004

(30) Foreign Application Priority Data

Dec. 12, 2002 (JP) .............................. 2002-360488

(51) Int. Cl.
*B60Q 1/00* (2006.01)
(52) U.S. Cl. ..................... 340/457.1; 340/438; 701/45; 280/801.1
(58) Field of Classification Search ............. 340/457.1, 340/438, 815.45, 691.3; 701/45; 280/801.1
See application file for complete search history.

(56) References Cited

U.S. PATENT DOCUMENTS

| 3,874,474 | A | * | 4/1975 | Quantz ........................ 180/270 |
| 3,875,556 | A |   | 4/1975 | Beaird |
| 4,849,733 | A | * | 7/1989 | Conigliaro et al. ...... 340/457.1 |
| 5,483,221 | A | * | 1/1996 | Mutter et al. ............ 340/457.1 |
| 6,002,325 | A | * | 12/1999 | Conaway ................. 340/384.1 |
| 6,059,066 | A |   | 5/2000 | Lary |
| 6,215,395 | B1 | * | 4/2001 | Slaughter et al. ........ 340/457.1 |
| 6,278,358 | B1 | * | 8/2001 | Spoto et al. ............. 340/425.5 |
| 6,362,734 | B1 | * | 3/2002 | McQuade et al. ....... 340/457.1 |
| 6,774,781 | B1 | * | 8/2004 | Lee ............................ 340/468 |

FOREIGN PATENT DOCUMENTS

| FR | 2 839 287 | 11/2003 |
| JP | A 11-348729 | 12/1999 |
| JP | A 2002-260119 | 9/2002 |

* cited by examiner

*Primary Examiner*—Jeffery Hofsass
*Assistant Examiner*—Edny Labbees
(74) *Attorney, Agent, or Firm*—Oliff & Berridge, PLC

(57) ABSTRACT

A simple and inexpensive seatbelt use indicating apparatus that allows easy recognition of the states of use/non-use of the seatbelt is provided. The apparatus includes a design figure that implies whether the seatbelt is used or not, and a lamp portion that indicates the use or the non-use of the seatbelt of each seat location via the color of light. The lamp portion causes two-color LEDs to glow corresponding to indications of the seat locations in accordance with the on/off states of buckle switches provided in seatbelt devices. Whether a seatbelt is used or not is indicated by changing the color of light of a corresponding LED, that is, changing the fashion of indication. The glow of LEDs is changed between red and green. Red glow of an LED indicates that a corresponding seatbelt is used, and green glow of the LED indicates that the corresponding seatbelt is not used.

14 Claims, 5 Drawing Sheets

SEATBELT USE INDICATING APPARATUS AND METHOD

INCORPORATION BY REFERENCE

The disclosure of Japanese Patent Application No. 2002-360488 filed on Dec. 12, 2002, including the specification, drawings and abstract, are incorporated herein by reference in their entirety.

BACKGROUND OF THE INVENTION

1. Field of the Invention

The invention relates to a seatbelt use indicating apparatus and method and, more particularly, to a seatbelt use indicating apparatus that has a warning lamp that prompts an occupant to use a seatbelt device.

2. Description of the Related Art

Vehicles equipped with seatbelt devices have a seatbelt warning lamp for warning of non-use of the seatbelt.

Such a seatbelt warning lamp is provided with an occupant detection sensor and a buckle switch that form a circuit. If an occupant is detected via the occupant detection sensor but the seatbelt is not worn (the buckle switch is off), the warning lamp flickers.

For example, Japanese Patent Application Laid-Open Publication No. 11-348729 proposes an apparatus (first related-art technology) in which if a human body sensor for detecting the presence/absence of a human body detects a human body and a seatbelt use detection switch provided in a buckle portion for detecting the fastening of a seatbelt is off, a control portion sends a signal to a warning portion. This arrangement allows appropriate execution of occupant detection and appropriate execution of diagnosis of the occupant detection switch.

Japanese Patent Application Laid-Open Publication No. 2002-260119 proposes a technology (second related-art technology) in which it is determined whether a seatbelt device is appropriately worn and used on the basis of results of detection by various sensors or the like; for example, it is detected whether the shoulder anchor of the seatbelt device is set so that the belt extends on an occupant's shoulder through the use of an image processing technique or the like, and if it is determined that the seatbelt device is appropriately used, a green or blue-color indication is produced or a voice guidance is output.

However, in the first related-art technology, when an occupant fastens the seatbelt device, the warning lamp turns off. The warning lamp is also off when there is no occupant. Therefore, if the warning lamp fails to turn on, it is not easy to recognize whether the seatbelt device in use or not in use.

Furthermore, the first and second related-art technologies have a problem of increased costs due to the employment of an occupant detection sensor, an image processing technique or the like in order to determine the presence/absence of an occupant.

SUMMARY OF THE INVENTION

The invention has been accomplished in order to solve the aforementioned problems. It is an object of the invention to provide a simple-construction and low-cost seatbelt use indicating apparatus and method that allows easy recognition of the state of use/non-use of a seatbelt.

In order to achieve the aforementioned and other objects, an aspect of the invention provides seatbelt use indicating apparatus and method. The seatbelt use indicating apparatus includes: a detector that detects whether a seatbelt is used; a use indicator that indicates that the seatbelt is used based on a result of detection provided by the detector; and a non-use indicator that indicates that the seatbelt is not used based on a result of detection provided by the detector.

The seatbelt use indicating method includes the steps of: detecting whether a seatbelt is used; indicating that the seat belt is used based on a result of detection; and indicating that the seatbelt is not used based on a result of detection.

According to this seatbelt use indicating apparatus and method, the detector detects whether a seatbelt is used. For example, whether the seatbelt is used or not can be detected via a buckle switch that detects engagement of a buckle portion and a tongue plate provided on the webbing of the seatbelt device.

The use indicator indicates that the seatbelt is used. The non-use indicator indicates that the seatbelt is not used. Thus, the use indicator and the non-use indicator allow recognition of the use/non-use of the seatbelt. Thus, with a simple and low-cost construction, it becomes possible for a driver or the like to easily recognize the state of an occupant protection device.

BRIEF DESCRIPTION OF THE DRAWINGS

The above mentioned embodiment and other embodiments, objects, features, advantages, technical and industrial significance of this invention will be better understood by reading the following detailed description of the exemplary embodiments of the invention, when considered in connection with the accompanying drawings, in which.

DESCRIPTION OF THE EXEMPLARY EMBODIMENTS

In the following description, the present invention will be described in more detail in terms of exemplary embodiments.

Figure 1:
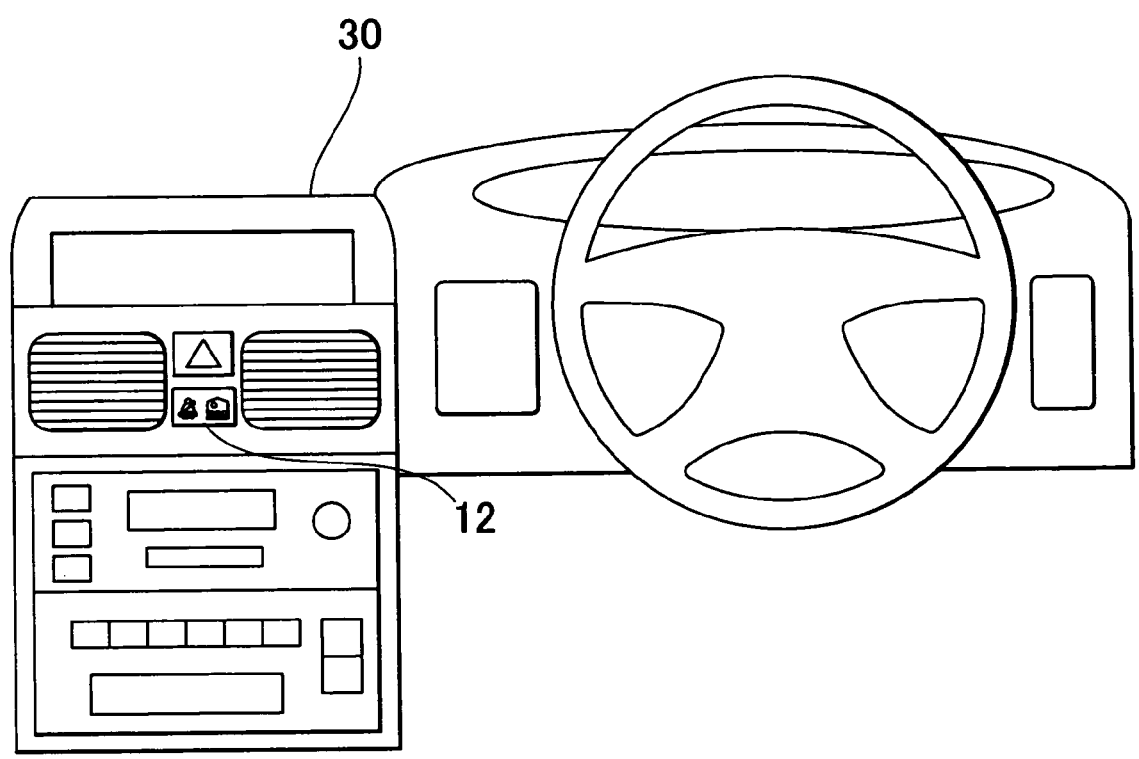
FIG. 1 is a diagram illustrating an arrangement of an indicator portion of a seatbelt use indicating apparatus in accordance with an embodiment of the invention.

FIG. 1 illustrates a layout of an indicator portion 12 of a seatbelt use indicating apparatus in accordance with an embodiment of the invention.

The seatbelt use indicating apparatus of the embodiment of the invention detects whether a tongue plate provided on the webbing of a seatbelt device has been engaged with a buckle portion, and indicates whether the seatbelt is used via a warning lamp or the like.

As shown in FIG. 1, the indicator portion 12 of the seatbelt use indicating apparatus of the embodiment of the invention is disposed in a substantially central portion of an instrument panel 30, and indicates the states of use or non-use of the seatbelt of a front passenger seat and rear seats.

Figure 2:
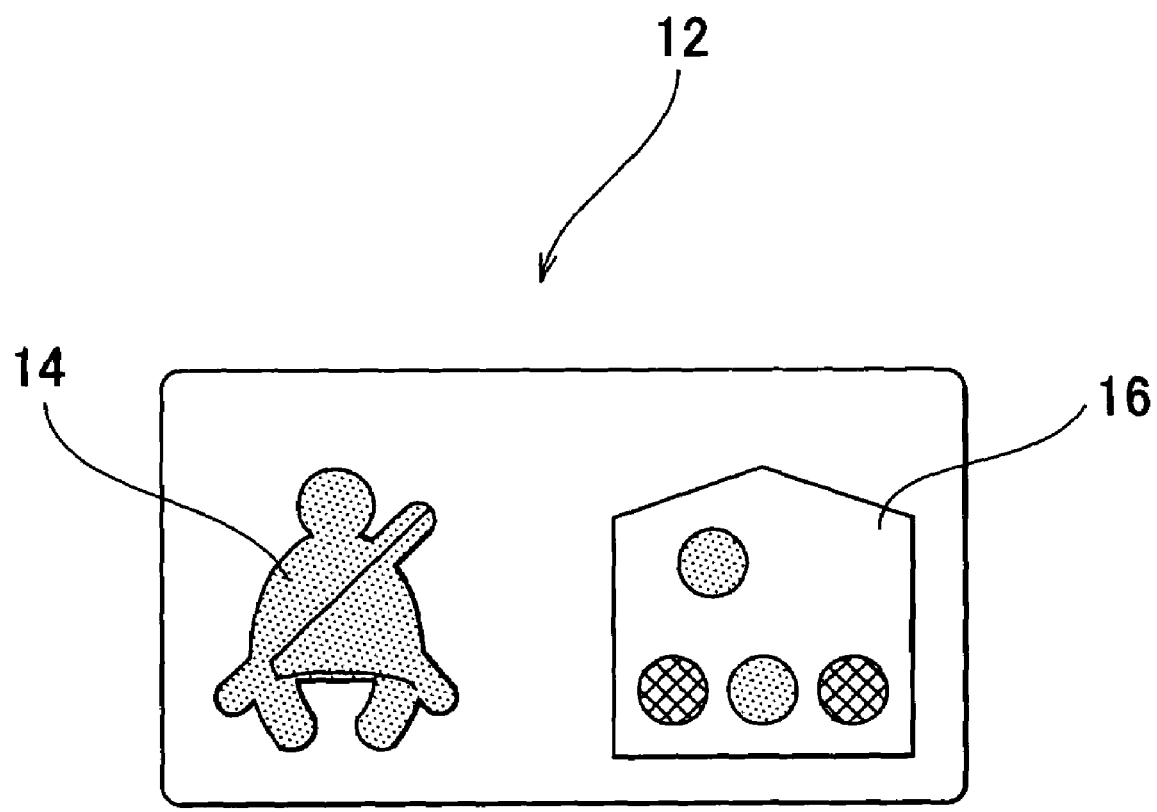
FIG. 2 is a diagram illustrating the indicator portion of the seatbelt use indicating apparatus in accordance with the embodiment of the invention.

In this embodiment, the indicator portion 12, as shown in FIG. 2, has a design FIG. 14 that indicates the state of use (wear) or non-use (non-wear) of each seatbelt, and a lamp portion 16 that indicates the use or non-use of the seatbelt of each seat location by different lighting colors.

The lamp portion 16 has two-color LEDs corresponding to indications of the locations of seats in the vehicle, and changes the fashion of indication based on the lighting color of LEDs. The lamp portion 16 thus indicates the use or non-use of the seatbelt of each seat location. In this embodiment, the two-color LEDs glow in red and green. In FIG. 2, hatched portions indicate that the portions are glowing in green, and screened portions indicate that the portions are glowing in red.

FIRST EMBODIMENT

Figure 3:
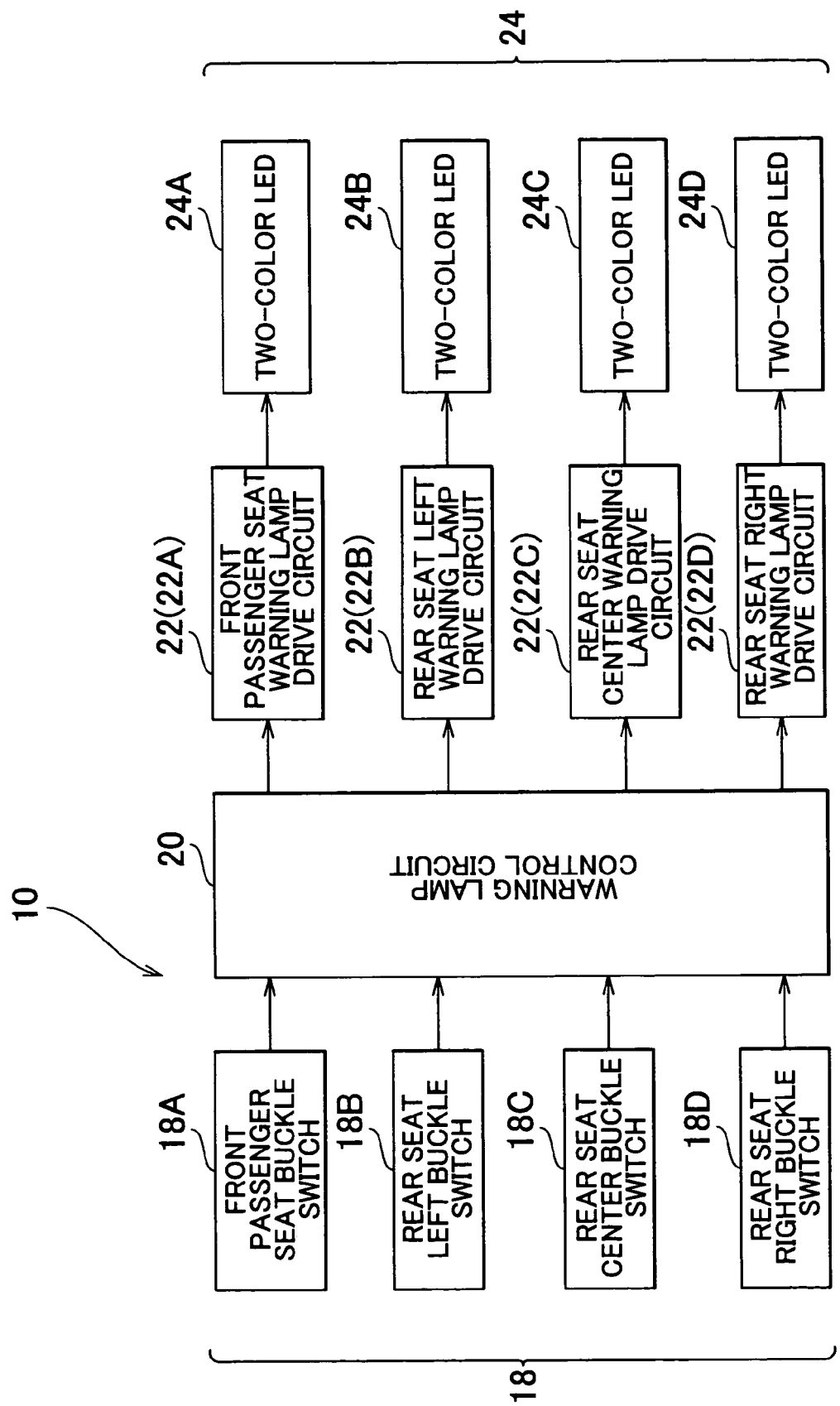
FIG. 3 is a block diagram illustrating the construction of the seatbelt use indicating apparatus in accordance with the first embodiment of the invention.

A construction of the seatbelt use indicating apparatus 10 in accordance with a first embodiment of the invention will be described with reference to FIG. 3.

In the seatbelt use indicating apparatus 10 of this embodiment, the glow of the lamp portion 16 is controlled by a warning lamp control circuit 20.

Each seat (the front passenger seat, the rear seat left, the rear seat center, and the rear seat right) is provided with a seatbelt device for restraining an occupant. Furthermore, each seat is provided with a buckle switch 18 (a front passenger seat buckle switch 18A, a rear seat left buckle switch 18B, a rear seat center buckle switch 18C, and a rear seat right buckle switch 18D) for detecting whether a tongue plate provided on the webbing of the seatbelt device is engaged with a buckle portion.

Each buckle switch 18 is connected to the warning lamp control circuit 20. The state of engagement of the tongue plate with the buckle portion detected by each buckle switch 18 is output in the form of an on-off signal. Each buckle switch 18 in the embodiment turns on when the tongue plate is engaged with the buckle portion, and turns off when the tongue plate is not engaged with the buckle portion. However, this arrangement is not restrictive. For example, each buckle switch 18 may turn on when the tongue plate is not engaged with the buckle portion, and may turn off when the tongue plate is engaged with the buckle portion.

In accordance with the on/off state of each buckle switch 18, the warning lamp control circuit 20 outputs a warning lamp signal for turning on a warning lamp to a drive circuit 22 corresponding to the buckle switch 18 (a front passenger seat warning lamp drive circuit 22A, a rear seat left warning lamp drive circuit 22B, a rear seat center warning lamp drive circuit 22C, a rear seat right warning lamp drive circuit 22D). As for the warning lamp control circuit 20, it is possible to apply a microcomputer, such as a CPU or the like, and it is also possible to apply a logic circuit or the like.

The drive circuits 22 are connected to two-color LEDs 24 (24A to 24D) as warning lamps for lighting the portions of the lamp portion 16 shown in FIG. 2 corresponding to the seats. Each two-color LED 24 is turned on by a corresponding one of the drive circuits 22. In this embodiment, each two-color LED 24 glows in green and red. However, this arrangement is not restrictive. For example, two-color LEDs that glow in blue and red may instead be used.

More specifically, if a buckle switch 18 is on, the warning lamp control circuit 20 determines that a corresponding seatbelt is fastened, and outputs a green glow signal to a drive circuit 22 corresponding to the buckle switch 18 so as to cause a corresponding two-color LED 24 to glow in green. Conversely, if a buckle switch 18 is off, the warning lamp control circuit 20 determines that a seatbelt corresponding to the buckle switch 18 is not fastened, and outputs a red glow signal to a corresponding drive circuit 22 so as to cause a corresponding two-color LED 24 to glow in red. Each drive circuit, upon outputting a red glow signal from the warning lamp control circuit 20, drives a corresponding two-color LED 24 so that the two-color LED 24 glows in red. Upon outputting a green glow signal from the warning lamp control circuit 20, each drive circuit drives a corresponding two-color LED 24 so that the two-color LED 24 glows in green.

That is, if a buckle switch 18 is off, a warning lamp control circuit 20 functions as an inverting circuit so as to output the red glow signal to a corresponding drive circuit 22. Therefore, the two-color LEDs 24 are on even when the corresponding buckle switches 18 are off. Thus, in the embodiment, in accordance with whether a seatbelt is fastened, the color of glow of the corresponding two-color LED 24 is changed, that is, the fashion of indication is changed. Thus, the state of use/non-use of each seatbelt is indicated via a single indicator device.

The buckle switches 18 correspond to a detector in invention. The warning lamp control circuit 20, the drive circuits 22 and the two-color LEDs 24 correspond to a use indicator and a non-use indicator.

Figure 4:
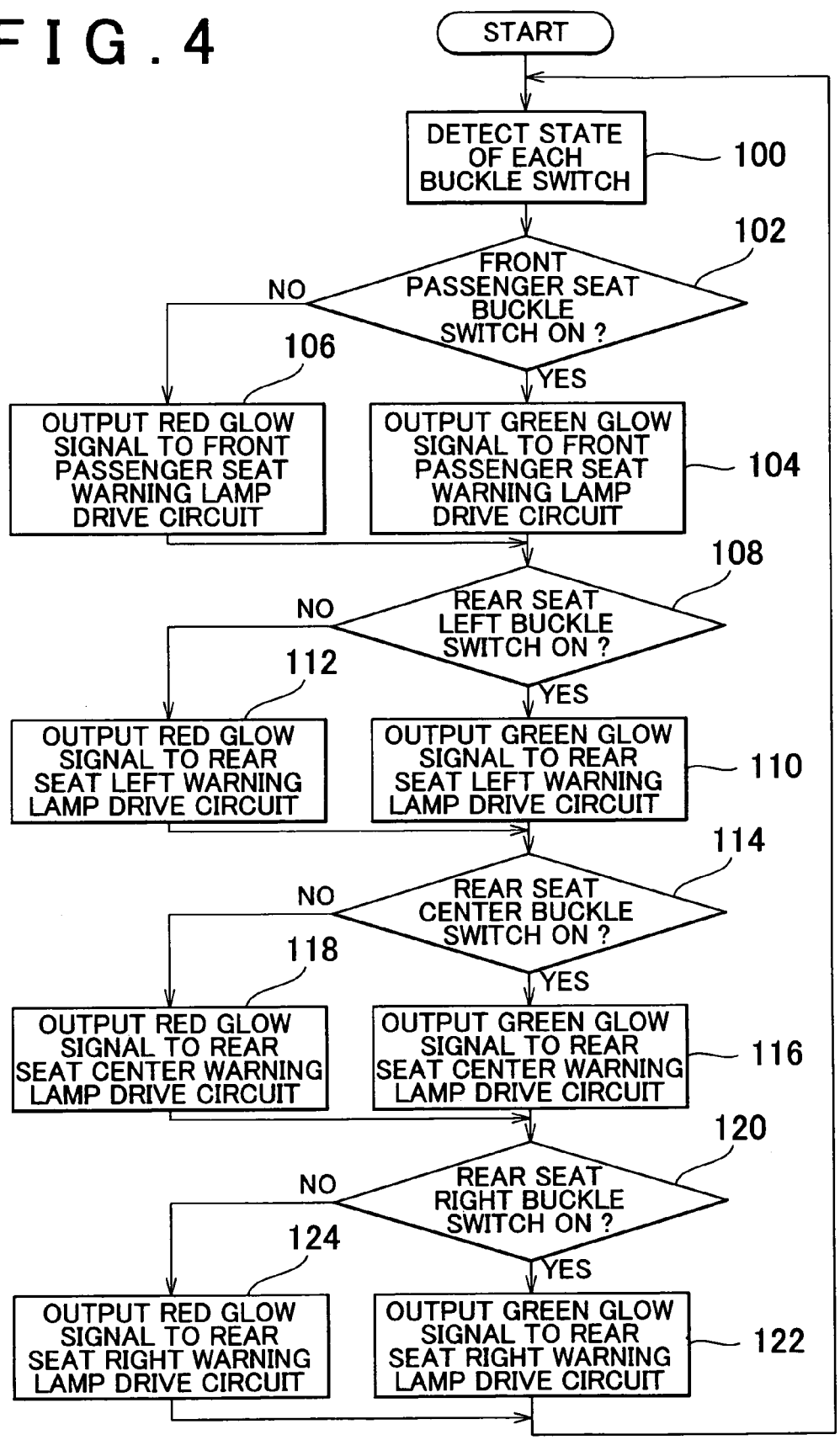
FIG. 4 is a flowchart illustrating operation of the seatbelt use indicating apparatus of the invention.

An operation of the seatbelt use indicating apparatus constructed as described above will be described with reference to the flowchart of FIG. 4.

In step 100, the state of each buckle switch 18 is detected by the warning lamp control circuit 20. That is, the on/off state of each buckle switch 18 is detected.

In step 102, it is determined by the warning lamp control circuit 20 whether the front passenger seat buckle switch 18A is on. If the determination is affirmative, the process proceeds to step 104, in which the green glow signal is output to the front passenger seat warning lamp drive circuit 22A. Then, the front passenger seat warning lamp drive circuit 22A causes the two-color LED 24A to glow in green, so that the location in the lamp portion 16 shown in FIG. 2 corresponding to the front passenger seat is lighted in green. After that, the process proceeds to step 108.

If the determination at step 102 is negative, the process proceeds to step 106, in which the red glow signal is output to the front passenger seat warning lamp drive circuit 22A. Then, the front passenger seat warning lamp drive circuit 22A causes the two-color LED 24A to glow in red, so that the location in the lamp portion 16 shown in FIG. 2 corresponding to the front passenger seat is lighted in red. After that, the process proceeds to step 108.

In step 108, it is determined by the warning lamp control circuit 20 whether the rear seat left buckle switch 18B is on. If the determination is affirmative, the process proceeds to step 110, in which the green glow signal is output to the rear seat left warning lamp drive circuit 22B. Then, the rear seat left warning lamp drive circuit 22B causes the two-color LED 24B to glow in green, so that the location in the lamp portion 16 shown in FIG. 2 corresponding to the rear seat left is lighted in green. After that, the process proceeds to step 114.

Conversely, if the determination at step 108 is negative, the process proceeds to step 112, in which the red glow signal is output to the rear seat left warning lamp drive circuit 22B. Then, the rear seat left warning lamp drive circuit 22B causes the two-color LED 24B to glow in red, so that the location in the lamp portion 16 shown in FIG. 2 corresponding to the rear seat left is lighted in red. After that, the process proceeds to step 114.

In step 114, it is determined by the warning lamp control circuit 20 whether the rear seat center buckle switch 18C is on. If the determination is affirmative, the process proceeds to step 116, in which the green glow signal is output to the rear seat center warning lamp drive circuit 22C. Then, the rear seat center warning lamp drive circuit 22C causes the two-color LED 24C to glow in green, so that the location in the lamp portion 16 shown in FIG. 2 corresponding to the rear seat center is lighted in green. After that, the process proceeds to step 120.

Conversely, if the determination at step 114 is negative, the process proceeds to step 118, in which the red glow signal is output to the rear seat center warning lamp drive circuit 22C. Then, the rear seat center warning lamp drive circuit 22C causes the two-color LED 24C to glow in red, so that the location in the lamp portion 16 corresponding to the rear seat center is lighted in red. After that, the process proceeds to step 120.

In step 120, it is determined by the warning lamp control circuit 20 whether the rear seat right buckle switch 18D is on. If the determination is affirmative, the process proceeds to step 122, in which the green glow signal is output to the rear seat right warning lamp drive circuit 22D. Then, the rear seat right warning lamp drive circuit 22D causes the two-color LED 24D to glow in green, so that the location in the lamp portion 16 shown in FIG. 2 corresponding to the rear seat right is lighted in green. After that, the process returns to step 100, so that the above-described process is repeated.

Conversely, if the determination at step 120 is negative, the process proceeds to step 124, in which the red glow signal is output to the rear seat right warning lamp drive circuit 22D. Then, the rear seat right warning lamp drive circuit 22D causes the two-color LED 24D to glow in red, so that the location in the lamp portion 16 shown in FIG. 2 corresponding to the rear seat right is lighted in red. After that, the process proceeds to step 100, so that the above-described process is repeated.

In the embodiment, a two-color LED 24 glows in red when a corresponding seatbelt is not fastened. The state of glow of the two-color LED 24 changes to green glow when the seatbelt is fastened. A driver or the like can recognize the state of use of the seatbelt of each seat by checking the colors of light displayed in the lamp portion 16.

In the case of a lamp glow failure or the like, the aforementioned relevant technology does not distinguish the failure from the fastened state of a seat belt. However, in this embodiment, since each two-color LED 24 glows both when a corresponding seatbelt is fastened and when the corresponding seatbelt is not fastened, a glow failure of a two-color LED 24 or the like can be distinguished from the fastened state of a corresponding seatbelt.

Furthermore, in the embodiment, since the warning lamp control circuit 20 includes an inverting circuit and the like, each two-color LED 24 glows in green when a corresponding one of the buckle switches 18 is on. This allows determination as to whether there is an occupant without the need to provide an occupant detection sensor or the like. Therefore, expansion of the application of the seatbelt use indicating apparatus to rear seats can easily be accomplished merely by adding buckle switches. Thus, with a simple and low-cost construction, it becomes possible for a driver or the like to recognize the state of use/non-use of the seatbelt of each seat.

SECOND EMBODIMENT

A construction of a seatbelt use indicating apparatus 11 in accordance with a second embodiment of the invention will be described with reference to FIG. 5. Portions and arrangement of the second embodiment comparable to those of the first embodiment are indicated by comparable reference characters.

Each seat (the front passenger seat, the rear seat left, the rear seat center, and the rear seat right) of a vehicle is provided with a seatbelt device for restraining an occupant. Furthermore, each seat is provided with a buckle switch 18 for detecting whether a tongue plate provided on the webbing of the seatbelt device is engaged with a buckle portion.

Figure 5:
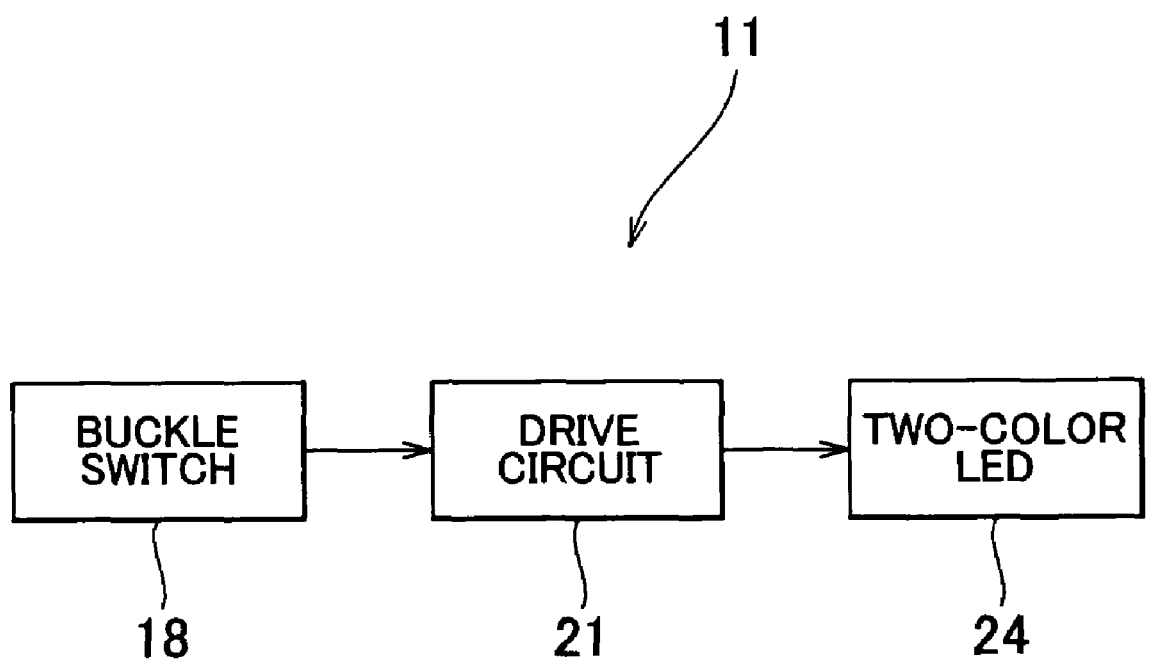
FIG. 5 is a block diagram illustrating the construction of a seatbelt use indicating apparatus in accordance with a second embodiment of the invention.

As indicated in FIG. 5, each buckle switch 18 is connected to a drive circuit 21 for a driving two-color LED 24. The drive circuit 21 drives the two-color LED 24 in accordance with the on/off state of each buckle switch 18. Each buckle switch 18 in this embodiment turns on when the tongue plate is engaged with the buckle portion, and turns off when the tongue plate is not engaged with the buckle portion. However, this is not restrictive. For example, each buckle switch 18 may turn on when the tongue plate is not engaged with the buckle portion, and turns off when the tongue plate is engaged with the buckle portion.

More specifically, the drive circuit 21 includes an inverting circuit and the like. If a buckle switch 18 is off, a corresponding two-color LED 24 is caused to glow in red. If the buckle switch 18 is on, the two-color LED 24B is caused to glow in green.

The drive circuit 21 and the two-color LED 24 are provided corresponding to the buckle switch 18 of each seat. In accordance with the on/off state of each buckle switch 18, a corresponding portion of the two-color LEDs 24 is driven to emit light.

The buckle switches 18 correspond to a detector in the invention, and the drive circuits 21 and the two-color LEDs 24 correspond to a use indicator and a non-use indicator.

Operation of the seatbelt use indicating apparatus 11 for the seatbelt devices in accordance with the second embodiment having an above-described construction will next be described.

When the tongue plate of a seatbelt is engaged with the buckle portion, the buckle switch 18 turns on. When the buckle switch 18 turns on, the drive circuit 21 drives the two-color LED 24 so as to glow in green.

If a seatbelt is not used, the corresponding buckle switch 18 is off. If the buckle switch 18 is off, the inverting circuit included in the drive circuit 21 causes the two-color LED 24 to emit red light.

According to this embodiment, when a seatbelt is not fastened, a corresponding two-color LED 24 is caused to glow in red. The state of glow of the two-color LED 24 changes to green glow when the seatbelt is fastened. Therefore, a driver or the like can recognize the state of use of the seatbelt of each seat by checking the colors of light displayed in the lamp portion 16. That is, as shown in FIG. 2, the buckle switches 18, the drive circuits 21 and the two-color LEDs 24 are provided corresponding to the seats indicated in the lamp portion 16. Therefore, it becomes possible for a driver or the like to recognize the state of use/non-use of the seatbelt of each seat without fail, as in the first embodiment.

The aforementioned related-art technology is not able to distinguish a lamp glow failure or the like from the state of use of a seat belt if such a failure occurs. However, in this embodiment, since each two-color LED 24 glows both when a corresponding seatbelt is fastened and when the corresponding seatbelt is not fastened, a glow failure of a two-color LED 24 or the like can be distinguished from the fastened state of a corresponding seatbelt.

Furthermore, in the embodiment, since the drive circuit 21 includes an inverting circuit and the like, each two-color LED 24 glows in green when a corresponding one of the buckle switches 18 is on. This allows determination as to whether there is an occupant without the need to provide an occupant detection sensor or the like. Therefore, expansion of the application of the seatbelt use indicating apparatus to rear seats can be accomplished merely by adding buckle switches. Thus, with a simple and low-cost construction, it becomes possible for a driver or the like to recognize the state of use of the seatbelt of each seat.

In the foregoing embodiments, two-color LEDs 24 are caused to glow in red when corresponding seatbelts are not fastened, and are caused to glow in green when corresponding seatbelts are used. However, this arrangement is not restrictive. For example, one-color LEDs may be employed, and the fashion of LED indication or display may be varied by changing the state of glow of the one-color LEDs, for example, causing one-color LEDs to continuously glow when a seatbelt is not fastened and to flicker when the seatbelt is fastened. It is also possible to employ one-color LEDs and vary the fashion of LED indication or display by changing the brightness of the LEDs, for example, causing one-color LEDs to glow bright when a seatbelt is not fastened and to glow less bright when the seatbelt is fastened. It is also possible to employ one-color LEDs and vary the fashion of LED indication or display through combinations of the states of glow that include continuous glow and flickering, the brightness of the LEDs, etc. It is also possible to employ two-color LEDs and vary the fashion of LED indication or display through combinations of the states of glow, the brightness, the colors of light, etc.

In the foregoing embodiments, the two-color LEDs 24 are caused to glow in red when the corresponding seatbelts are not fastened. However, this is not restrictive. For example, the two-color LEDs 24 may be turned off after elapsed of a predetermined time.

Although in the foregoing embodiments, the driver's seat side is not discussed, the lamp portion 16 may be provided with a two-color LED corresponding to the driver's seat so that the two-color LED indicates the state of use of the seatbelt device of the driver's seat by colors of glow. As for the checking of the state of use/non-use of the seatbelt of the driver's seat, the device contained in a combination meter in a conventional construction may be utilized.

As is apparent from the foregoing description, the apparatus according to the invention detects whether a seatbelt is used, and indicates the state where the seatbelt is used, ad the state where the seatbelt is not used. Therefore, with a simple and low-cost construction, the apparatus allows a driver and the like to easily recognize the state of an occupant protection device.

While the invention has been described with reference to exemplary embodiments thereof, it is to be understood that the invention is not limited to the exemplary embodiments or constructions. To the contrary, the invention is intended to cover various modifications and equivalent arrangements. In addition, while the various elements of the exemplary embodiments are shown in various combinations and configurations, which are exemplary, other combinations and configurations, including more, less or only a single element, are also within the spirit and scope of the invention.

What is claimed is:

1. A seatbelt use indicating apparatus comprising:
    a detector that detects whether a seatbelt is used;
    a use indicator that indicates by displaying a first glow for indicating that the seatbelt is used based on a result of detection provided by the detector; and
    a non-use indicator that indicates by displaying a second glow for indicating that the seatbelt is not used based on a result of detection provided by the detector; wherein:
    both the first glow and the second glow are at least one of a flickering glow or a combination of a continuous glow and the flickering glow;
    the displayed second glow of the non-use indicator is brighter than the displayed first glow of the use indicator; and
    the second glow changes to the first glow when the use indicator determines that the seatbelt is in use, such that either the first glow or the second glow is always on to indicate the seatbelt status.

2. The seatbelt use indicating apparatus according to claim 1, wherein the use indicator and the non-use indicator are formed by a single indicator device that indicates a state where the seatbelt is used by displaying the first glow and a state where the seatbelt is not used by displaying the second glow, in different indication fashions.

3. The seatbelt use indicating apparatus according to claim 2, wherein the indication fashions further relate to at least one of a display color and a display state.

4. The seatbelt use indicating apparatus according to claim 1, wherein one of a plurality of the detectors, one of a plurality of the use indicators and one of a plurality of the non-use indicators are provided for each of a plurality of seats in a vehicle.

5. The seatbelt use indicating apparatus according to claim 1, wherein the detector detects the state of use/non-use of the seatbelt based on whether a tongue plate is engaged with a buckle portion.

6. The seatbelt use indicating apparatus according to claim 1, wherein the use indicator and the non-use indicator use an LED to indicate whether the seatbelt is used.

7. The seatbelt use indicating apparatus according to claim 1, wherein a state of seatbelt use or non-use can be distinguished from an indicator failure of either the use indicator or the non-use indicator, the indicator failure occurring when both the first glow and the second glow are off.

8. A seatbelt use indicating method comprising the steps of:
    detecting whether a seatbelt is used;
    indicating that the seatbelt is used by displaying a first glow based on a result of detection;
    indicating that the seatbelt is not used by displaying a second glow based on a result of detection; and
    changing the second glow into the first glow when the use indicator determines that the seatbelt is in use; wherein:
    both the first glow and the second glow are at least one of a flickering glow or a combination of a continuous glow and the flickering glow;
    the displayed second glow indicating that the seatbelt is not used is brighter than the displayed first glow indicating that the seatbelt is used; and,
    either the first glow or the second glow is always on to indicate the seatbelt status.

9. The seatbelt use indicating method according to claim 8, wherein a state where the seatbelt is used as indicated by the first glow and a state where the seatbelt is not used as indicated by the second glow are indicated in different indication fashions by a single indicator device.

10. The seatbelt use indicating method according to claim 9, wherein the indication fashions further relate to at least one of a display color and a display state.

11. The seatbelt use indicating method according to claim 8, wherein a detection regarding the state of use/non-use of the seatbelt, an indication that the seatbelt is used, and an indication that the seatbelt is not used are provided for each of a plurality of seats in a vehicle.

12. The seatbelt use indicating method according to claim 8, wherein whether the seatbelt is used is detected based on whether a tongue plate is engaged with a buckle portion.

13. The seatbelt use indicating method according to claim 8, wherein an LED is used to indicate whether the seatbelt is used.

14. The seatbelt use indicating method according to claim 8, wherein a state of seatbelt use or non-use can be distinguished from a indicator failure of either the use indicating step or the non-use indicating step, the indicating step failures occurring when both the first glow and the second glow are off.

* * * * *